United States Patent [19]

Marsh

[11] Patent Number: 5,257,084
[45] Date of Patent: Oct. 26, 1993

[54] GOLF SWING MEASUREMENT SYSTEM
[75] Inventor: James T. Marsh, Mission Viejo, Calif.
[73] Assignee: Golf Tempo, Inc., Los Gatos, Calif.
[21] Appl. No.: 951,187
[22] Filed: Sep. 25, 1992
[51] Int. Cl.$^5$ .......................... G01P 3/36; A63B 69/36
[52] U.S. Cl. ..................... 356/28; 273/186.1
[58] Field of Search ............... 273/186.1, 186.2, 186.3; 356/28

[56] References Cited
U.S. PATENT DOCUMENTS

| | | | |
|---|---|---|---|
| 3,194,563 | 7/1965 | Mackniesh | 273/186.1 |
| 3,685,909 | 8/1972 | Schwartz | 356/28 |
| 4,180,726 | 12/1979 | DeCrescent | 250/222 |
| 4,477,079 | 10/1984 | White | 273/186 |
| 4,713,686 | 12/1987 | Ozaki et al. | 358/107 |
| 4,979,745 | 12/1990 | Kobayashi | 273/186 |

Primary Examiner—Stephen C. Buczinski
Attorney, Agent, or Firm—Patrick T. King

[57] ABSTRACT

A technique for measuring golf swing tempo or clubhead speed for a golfer swinging a golf club through a tee area. Two parallel infrared (IR) transmitters transmit respective IR beams along predetermined lines toward the tee area. Respective IR sensors receive respective IR beams reflected from a reflector mounted to the shaft of the golf club, near the clubhead. Each IR sensors provides a respective output signal indicative of the passage of the golf club through a corresponding IR beam. Predetermined sequences of output signals from the IR sensors are detected and the differences in time between various output signals are measured to provide tempo and clubhead speed values for display on a LCD screen. The speed values can be compensated values as obtained from look-up tables.

55 Claims, 8 Drawing Sheets

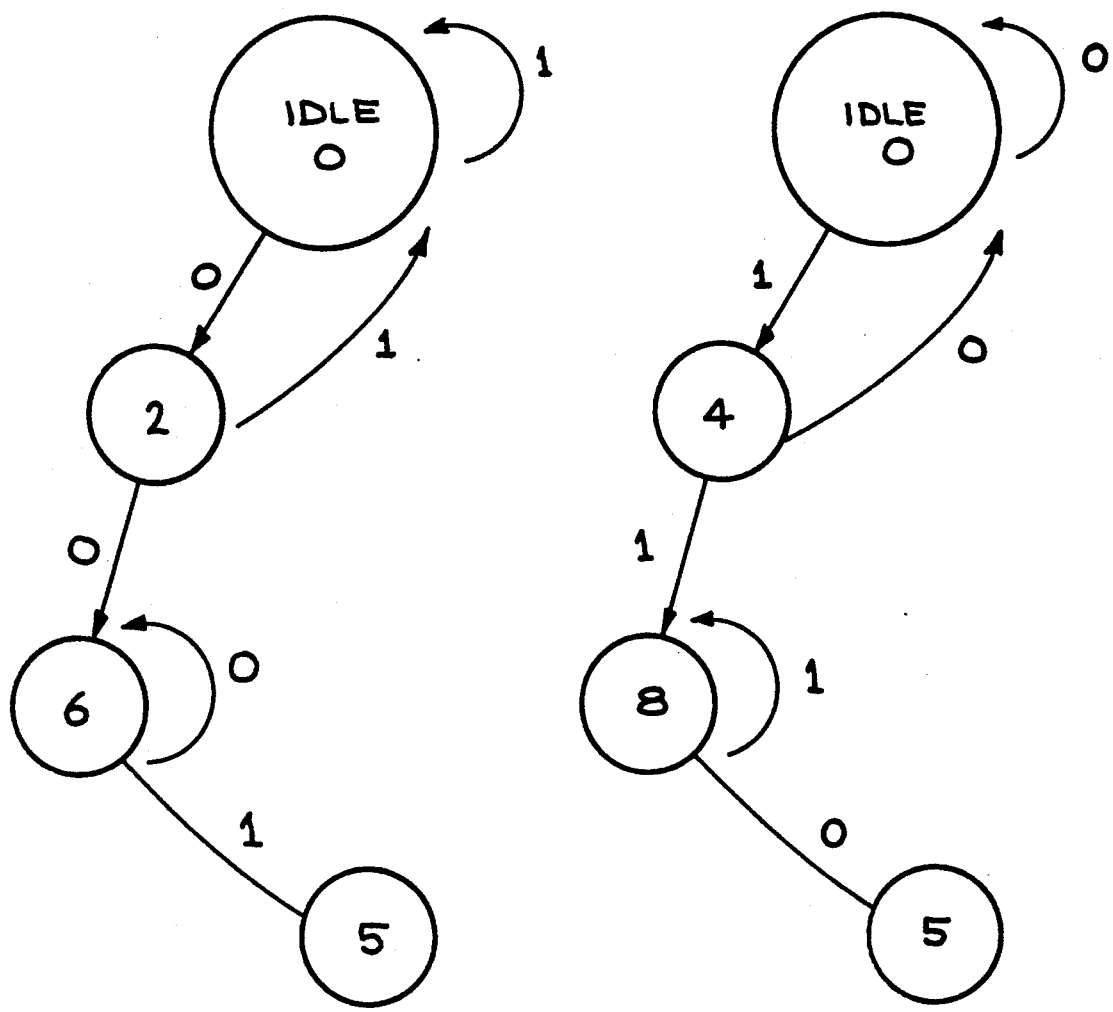
FIG.5B  FIG.5A
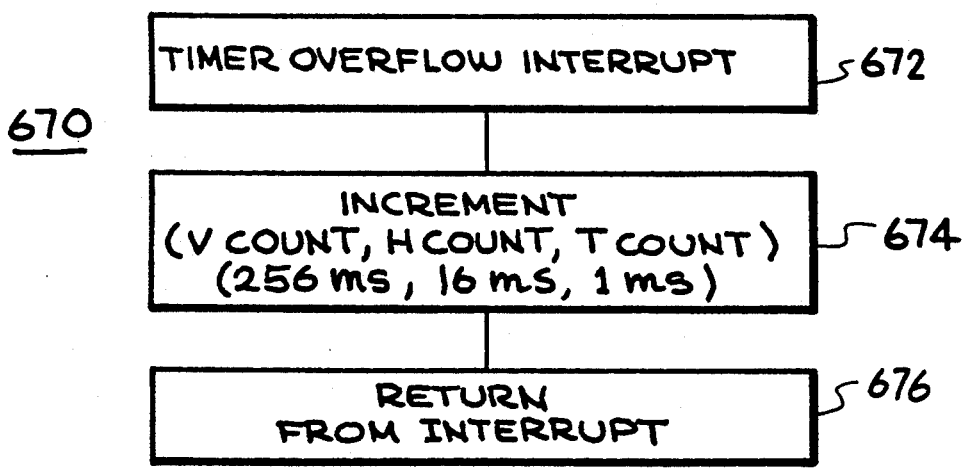
FIG.9

GOLF SWING MEASUREMENT SYSTEM

BACKGROUND OF THE INVENTION

1. Field of the Invention

This invention relates to equipment for measuring a golfer's swing and, more particularly, to swing-monitoring equipment for measuring the tempo of a golfer's back swing along with the speed of the golfer's clubhead.

2. Prior Art

Perfecting and maintaining a good golf swing is challenging for both a beginning golfer and for a professional golfer. A key element of a good golf swing is consistency and uniformity. Uniformity is required for both the swing tempo and the clubhead speed at the time of impact with the ball. Swing tempo measures the overall pace of a golfer's swing and can be measured as the elapsed time between the time of take-away of the clubhead from the ball and the moment of impact of the club with the ball. For best performance, each club has a particular tempo and club-head speed.

Prior art equipment for measuring tempo and clubhead speed includes a fixed system which has a fixed overhead light source to illuminate a tee area. A patterned array of separate light sensors is embedded in the tee area. Each light sensor is normally illuminated by the overhead light source. When a golf club is swung through the tee area, light from the overhead source is blocked from various ones of the sensors so that tempo and clubhead speed can be measured. This fixed type of installation is expensive and lacks portability.

What is needed is a small, light-weight, portable, battery-operated, relatively inexpensive golf swing-monitoring device for a golfer to use to improve his or her swing at any location, such as on a practice tee or putting green.

SUMMARY OF THE INVENTION

It is therefore an object of this invention to provide an improved technique for measuring and displaying tempo and clubhead speed for a golfer swinging various golf clubs, including woods, irons, and putters. Clubhead speed can be selectively enhanced be selected percentages at all speeds or by gradually increasing enhancement as a function of clubhead speed to provide In accordance with this and other objects of the invention, a system is provided for measuring and displaying performance parameters for either a right-handed golfer or a left-handed golfer swinging a golf club through an arbitrarily defined golf tee area. This system is useful with or without a golf ball. A left infrared (IR) transmitter transmits a left infrared (IR) beam along a predetermined line toward the tee area. A right IR transmitter also transmits a right IR beam along a predetermined line toward the tee area. The IR beams are substantially parallel and are spaced a few inches apart from each other. The tee area is located between the two IR beams so that the clubhead passes through the two beams.

A reflector is clipped around the distal end of the shaft of the golf club for reflecting the IR beams to respective IR sensors. A left IR sensor receives the left IR beam which is reflected from the reflector as the golf club passes through the left IR beam. Similarly, a right IR sensor receives a right IR beam which is reflected from the reflector mounted to the golf club. Each of the IR sensors provides a corresponding output signal indicative of the passage of the golf club through the respective IR beam. The right sensor provides a right-sensor output signal pulse R and the left sensor provides a left-sensor output signal pulse L.

A correct sequence of events for operation of the system with a right-handed golfer is to sense two consecutive right-sensor output signal pulses RR followed by one left-sensor output signal pulse L. The two right-sensor output signals indicate that the clubhead has been drawn away from the tee area into a back swing and has been returned to strike the ball. The left-sensor output signal indicates that the clubhead has passed through the ball.

To determine tempo, a measurement is made of the time interval between the time that the clubhead is drawn away from the ball to the time immediately prior to impact with the ball. Tempo is therefor a measurement of the difference in time between two consecutive right-sensor output signals. Means are provided for converting the difference in time between the two consecutive right-sensor output signals to a tempo value indicative of the back swing time, or tempo, of the golf swing.

To determine clubhead speed, the difference in time between the second of the two consecutive right-sensor output signals RR and a subsequent left-sensor output signal L is measured. Means are provided for converting the difference in time between the second of the two consecutive right-sensor output signals and the following left-sensor output signal to a clubhead-speed value indicative of the clubhead speed as the clubhead passes between the two beams.

Conversion of the difference in time between the second of the two consecutive right-sensor output signals and the following left-sensor output signal to a clubhead-speed value indicative of the clubhead speed is accomplished by using one or more look-up tables. If more than one look-up table is used, each of the look-up tables covers a predetermined range of clubhead-speed values. Means are provided for increasing each of the values of clubhead speed by a predetermined percentage, such as switch means for selecting one of a plurality of predetermined percentages, which may vary, for example, as a function of the difference in time between the second of the two consecutive right-sensor output signals and the following left-sensor output signal.

Visual display means are provided for displaying the tempo value and the clubhead-speed value to the golfer. The visual display means for displaying the tempo value and the clubhead-speed value to the golfer includes a liquid crystal display (LCD) screen and means for periodically reversing the polarity of digit display signals with respect to a back plane for the liquid crystal display (LCD) screen.

The reflection means which is mounted to the golf club for reflecting IR energy includes a cylindrical sleeve which has an external reflective surface and which encircles the hosel area of the club head at the distal end of a shaft of a golf club.

A clock pulse source provides clock output pulses for timing the system. A counter counts the number of clock output pulses between two consecutive right-sensor output signals to thereby measure the time interval between the two consecutive right-sensor output signals and providing a tempo value. Similarly, a number of clock output pulses are counted to measure the time interval between the second of the two consecutive right-sensor output signals and the following left-sensor output signal to provide a clubhead-speed value. The means for converting to a tempo value and the means for converting to a clubhead-speed value include a microprocessor which converts the tempo value and the clubhead-speed values using lookup tables, which provide clubhead speed in either miles per hour or kilometers per hour. The clubhead speed can be adjusted to compensate for mechanical and electronic delays.

Operation of the system for a left-handed golfer requires reversal of the sequences of signals. A correct sequence of events for operation of the system with a left-handed golfer is to sense two consecutive left-sensor output signal pulses LL. followed by one right-sensor output signal pulse R. The two left-sensor output signals indicate that the clubhead has been drawn away from the tee area into a back swing and has been returned to strike the ball. The right-sensor output signal indicates that the clubhead has passed through the ball.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5A is a state diagram for the right-handed mode of operation of the golf swing-monitoring device according to the invention.

FIG. 5B is a state diagram for the left-handed mode of operation of the golf swing-monitoring device according to the invention.

FIG. 9 is a flow chart diagram for a timer interrupt program for the golf swing-monitoring device.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
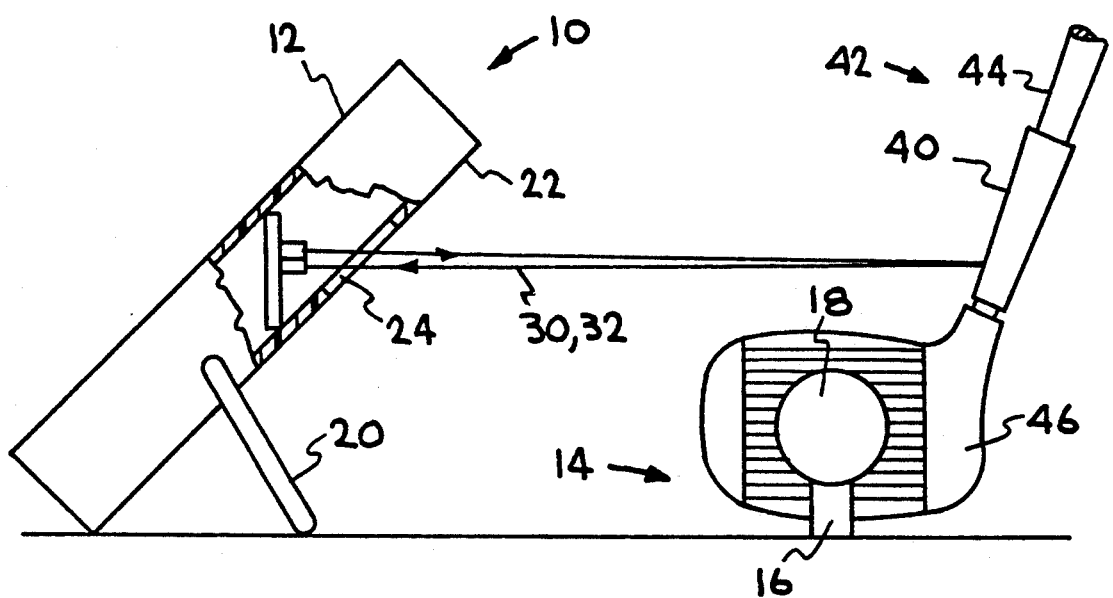
FIG. 1 is an elevation view of a golf swing-monitoring device in operation, according to the invention.
Figure 2:
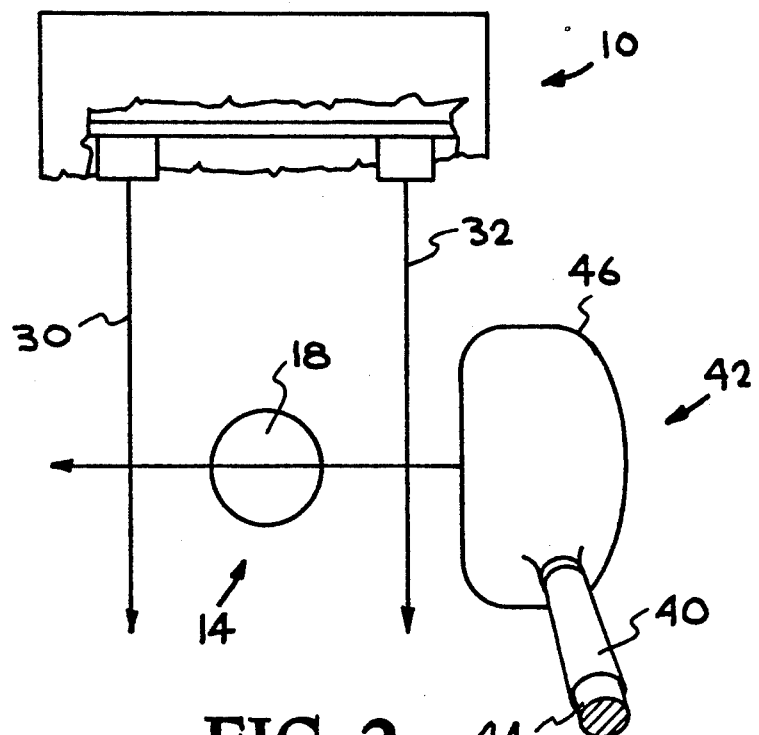
FIG. 2 is a top view of the golf swing-monitoring device of FIG. 1.

FIG. 1 and FIG. 2 show respective side and top operative views of a portable golf swing-monitoring device 10. The golf swing-monitoring device 10 measures and alternately displays the tempo of a golfer's swing and clubhead speed. The golf swing-monitoring device is housed in a molded plastic housing 12. The golf swing-monitoring device 10 is typically positioned on the ground or playing surface, directly in front of a golfer and approximately one foot from a tee area 14. The golfer swings a club so that the clubhead passes through the tee area 14 and near the golf swing-monitoring device 10. A golfer can elect either to swing and strike a golf ball in the tee area 14 or to take a practice swing through the tee area 14 without striking a ball. An optional tee 16 can be used. The golfer may strike an optional golf ball, golf ball substitute, or golf ball simulator (typically shown as 18), as desired.

To facilitate positioning of the golf swing-monitoring device 10, the housing 12 for the golf swing-monitoring device 10 is provided with a movable bail 20 attached to the case. The bail 20 is extended and fixed in position, as indicated by FIGS. 1 and 2, opposite the golfer at an angle with respect to the playing surface. This elevates the front end of the device and exposes the devices's bottom surface 22 to obliquely face the tee area, as indicated in FIG. 1.

The bottom surface 22 of the golf swing-monitoring device 10 includes a window 24 through which two parallel infrared (IR) beams are directed. One of these beams is designated as a left IR beam 30. The other beam is designated as a right IR beam 32. These beams 30, 32 are generated by respective IR sources contained within the golf swing-monitoring device 10. The IR beams 30, 32 are parallel to each other and are spaced apart a distance of approximately 3 inches. Each IR source also has closely associated with it a corresponding IR detector. The IR source and corresponding IR detector are, for example, provided together as part of a IR transmit/receive module, as indicated in FIG. 1. The function of an IR detector is to receive reflected IR light which has originated from an IR source and which is reflected back towards the IR source from an external IR-reflective body.

To utilize the golf swing-monitoring device 10, a resilient, molded-plastic, generally cylindrical, IR light-reflective sleeve 40 is attached to the end of a golf club. The light-reflective sleeve 40 is snapped in position around the hosel of a club 42 at the distal end of the club shaft 44 and adjacent the clubhead 46. The cylindrical sleeve 40 has a light-reflective external surface for reflecting IR back to the IR detector. As the reflective sleeve passes through one of the IR beams, IR light from that IR beam is reflected from the reflective sleeve 40 back towards its respective IR source inside the housing of the golf swing-monitoring device 10. The IR detector associated with that IR beam provides an output signal indicative of the reflective sleeve passing through the IR beam.

Figure 3A:
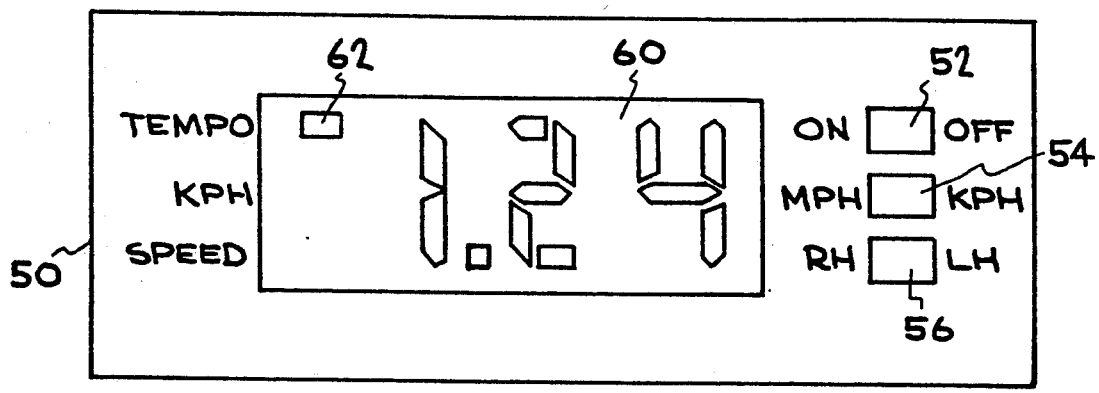
FIG. 3A is an elevation view of the display panel of the golf swing-monitoring device, showing a tempo measurement value.

FIG. 3A shows the front panel 50 of the golf swing-monitoring device 10. The front panel includes several user-acutuated slide-switches including: an on-off, slide-switch 52, a miles-per-hour (MPH) or kilometers-per-hour (KPH) slide-switch 54, and a right-hand (RH) or left-hand (LH) player slide-switch 56. A liquid crystal display (LCD) screen 60 provides a three-digit display of tempo or speed. As described herein below, the output signals from the IR detectors are processed to provide tempo and club speed values which are measured and subsequently displayed on the LCD screen 60 of the golf swing-monitoring device 10.

FIG. 3A shows a tempo measurement value being displayed on the liquid crystal display screen 60, where a TEMPO indicator bar 62 in the upper left corner of the liquid crystal display 60 is activated to indicate tempo values.

Figure 3B:
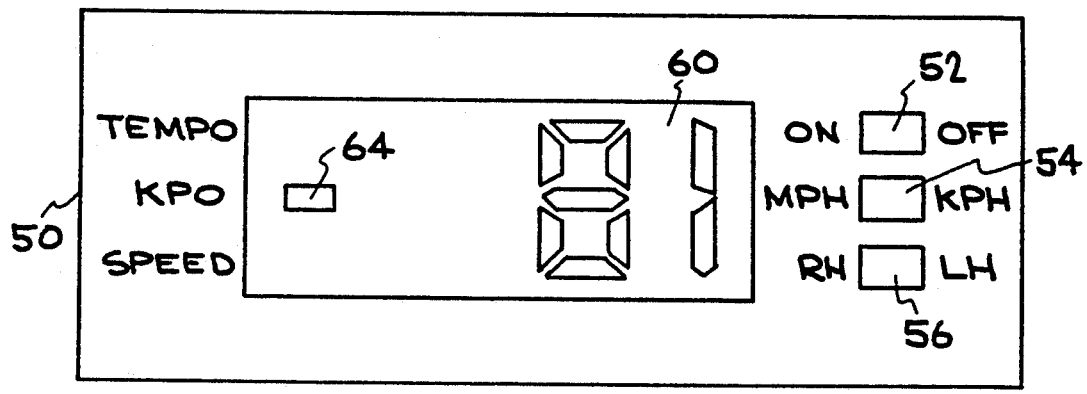
FIG. 3B is an elevation view of the display panel of the golf swing-monitoring device, showing a club-speed measurement value.

FIG. 3B shows a speed measurement value being displayed on the liquid crystal display 60, where a SPEED indicator bar 64 in the lower left corner of the liquid crystal display 60 is activated to indicate speed values. At low speeds, three digits are displayed with a decimal point between the last two digits. At high speeds over 100 mph three digits are displayed and at intermediate speeds, two digits are displayed. A KPH indicator bar 66 in the middle of the left side of the liquid crystal display 60 is activated to indicate that speed values are displayed in kilometers-per-hour, otherwise the speed values are displayed in miles-per-hour.

Figure 4A:
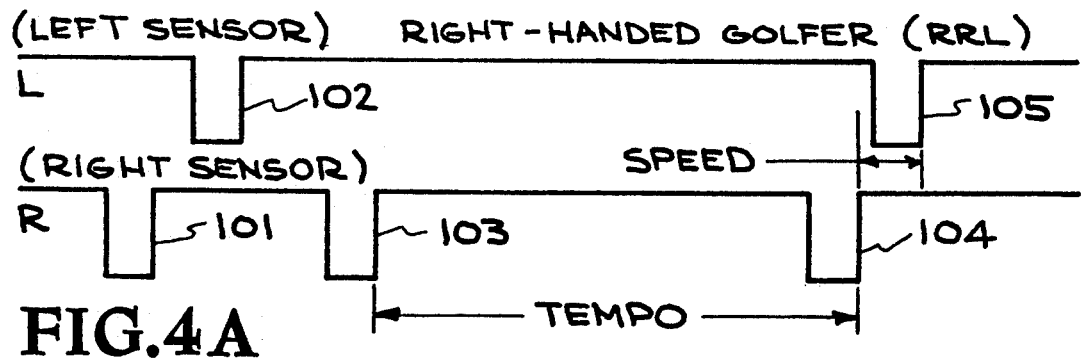
FIG. 4A is a timing diagram showing a valid sequence of output pulses from the left sensor and the right sensors of a golf swing-monitoring device for measuring and displaying tempo and speed information for a right-handed golfer.

FIG. 4A shows a timing diagram appropriate for a right-handed golfer. The top part of the diagram shows sequences of negative-polarity output pulses L received from the left IR sensor and the bottom part of the diagram shows sequences of negative-polarity output pulses R from the right IR sensor. As described below, for a right-handed golfer, a specific time sequence of output pulses L from the left sensor and output pulses R from the right sensors of the swing-measurement device 10 are required for determination of swing tempo and clubhead speed values.

A correct sequence of events for a right-handed golfer's swing is to sense two consecutive right-sensor output pulses RR followed by one left-sensor output pulse L. For a right-handed golfer, the correct sequence is RRL. The two right-sensor output pulses RR indicate that the clubhead has been drawn away from the tee into a back swing and that the clubhead has been returned to strike the ball. The immediately following left-sensor output pulse signal L indicates that the clubhead has passed through the ball. In FIG. 4A, the sequence or combination of pulses 101, 102, and 103 have a RLR sequence, which is improper. The sequence or combination of pulses 103, 104, 105 have a correct RRL sequence.

To determine swing tempo for a right-handed golfer, a measurement is made of the time interval between the time that the clubhead is drawn away from the ball to the time immediately prior to impact with the ball. For a right-handed golfer, swing tempo is measured by taking the difference in time between the positive-going two consecutive right-sensor output pulses RR. For example, the time difference between RR pulses 103, 104 provides a measurement of tempo. As described herein below, means are provided for converting the difference in time between the two consecutive right-sensor output pulses RR to a swing tempo value, which is indicative of the back swing time and down swing time, or tempo, of a golf swing.

To determine clubhead speed for a right-handed golfer, the time difference between the second pulse 104 of two consecutive right-sensor pulses and an immediately following left-sensor pulse 105 is measured. Means, such as a microcomputer system described herein below, are provided for converting the difference in time between the second of the two consecutive right-sensor output signals and the immediately following left-sensor output signal to a clubhead-speed value indicative of the speed of the clubhead as the clubhead passes between the two beams.

Figure 4B:
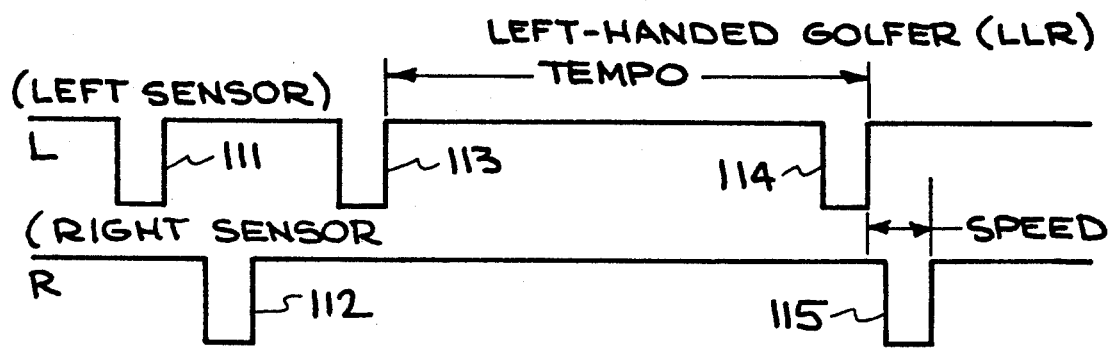
FIG. 4B is a timing diagram showing a valid sequence of output pulses from the left sensor and the right sensors of a golf swing-monitoring device for measuring tempo and speed information for a left-handed golfer.

FIG. 4B shows a timing diagram showing appropriate timing sequences for a left-handed golfer. The Figure shows a valid sequence of negative-polarity output pulses from the left sensor and the right sensor of a golf swing-monitoring device 10 for determining tempo and speed for a left-handed golfer. For a left-handed golfer, a certain time sequence of output pulses L from the left sensor and output pulses R from the right sensors of the swing-measurement device 10 are required for proper determination of tempo and speed. A correct sequence of events for a left-handed golfer is to sense two consecutive left-sensor output pulses immediately followed by one right-sensor output pulse R. The two left-sensor output signals LL indicate that the clubhead has been drawn away from the tee into a back swing and has been returned to strike the ball. The immediately following right-sensor output signal R indicates that the clubhead has passed through the ball.

For a left-handed golfer, a correct sequence of sensor pulses is LLR. In FIG. 4B pulses 111, 112, and 113 have a LRL sequence, which is improper. Pulses 113, 114, 115 have a correct LLR sequence.

To determine swing tempo for a left-handed golfer, a measurement is made of the time interval between the time that the clubhead is drawn away from the ball to the time immediately prior to impact with the ball. For a left-handed golfer, tempo is a measurement of the difference in time between two consecutive left-sensor output pulses LL. As described herein below, means are provided for converting the difference in time between the two consecutive left-sensor output pulses LL to a tempo value indicative of the back swing time, or tempo, of the left-handed golf swing.

To determine clubhead speed for a left-handed golfer, the difference in time between the second of the two consecutive left-sensor output pulses L and a subsequent right-sensor output pulse R is measured. For example, the time difference between the positive-going edge of the second consecutive left-sensor pulse 114 and the positive-going edge of the right-sensor pulse 115 is a measure of clubhead speed. Microprocessor means are provided for converting the difference in time between the second of the two consecutive left-sensor output signals and the following right-sensor output signal to a clubhead-speed value indicative of the clubhead speed as the clubhead passes between the two beams.

FIG. 5A shows a state diagram for the right-handed mode of operation implemented in the golf swing-monitoring device 10 according to the invention. STATE 0 is an idle state where the system displays previously obtained tempo and speed measurements. In STATE 0, the system awaits the occurrence of input pulses. A "0" input signal indicates that a left-sensor pulse L has occurred and a "1" input signal indicates that a right-sensor pulse R has occurred.

State 4 is an intermediate state which is entered when the system in STATE 0 receives a right-sensor pulse R (or 1). If, while the system is in STATE 4, a left-sensor pulse L (or 0) occurs, the system reverts to the idle STATE 0. If while the system is in STATE 4, a right-sensor pulse R (or 1) occurs, the system moves to a second intermediate STATE 8. Note that for a right-handed golfer, two consecutive R signals indicate that a back swing has been taken.

The state diagram of FIG. 5A indicates that the system remains in STATE 8 as long as a number of additional consecutive right-sensor pulses R (or 1's) are received. The first left-sensor pulse L (or 0) moves the system to STATE 5 after the last two consecutive right-sensor pulses are received. In STATE 5 the system measures the time interval between the last two right-sensor signals to determine tempo. The time interval between the last of a sequence of two right-sensor signals and the immediately following left-sensor signal is measured to determine clubhead speed. After the functions of STATE 5 are completed, the system returns to the idle STATE 0.

FIG. 5B shows a state diagram for the left-handed mode of operation of the golf swing-monitoring device 10. This state diagram functions similarly to that of FIG. 5A. STATE 0 is the idle state where the system displays previously obtained tempo and speed measurements. In STATE 0, the system awaits the occurrence of input pulses. A "0" input signal indicates that a left-sensor pulse L has occurred and a "1" input signal indicates that a right-sensor pulse R has occurred.

State 2 is an intermediate state which is entered when the system in STATE 0 receives a left-sensor pulse L (or 0). If, while the system is in STATE 2, a right-sensor pulse R (or 1) occurs, the system reverts to the idle STATE 0. If while the system is in STATE 2, a LEFT-sensor pulse L (or 0) occurs, the system moves to a second intermediate STATE 6. Note that two consecutive L signals indicate that a left-handed back swing has been taken.

The system remains in the second intermediate STATE 6 when any number of additional left-sensor pulses L (or 0) are received. The first right-sensor pulse R (or 1) moves the system to STATE 5 after the last two consecutive left-sensor pulses are received. In STATE 5 the system measures the time interval between the last two left-sensor signals to determine tempo for a left-handed golfer. The time interval between the last left-sensor signal and the right-sensor signal is measured to determine club head speed for a left-handed golfer.

Figure 6:
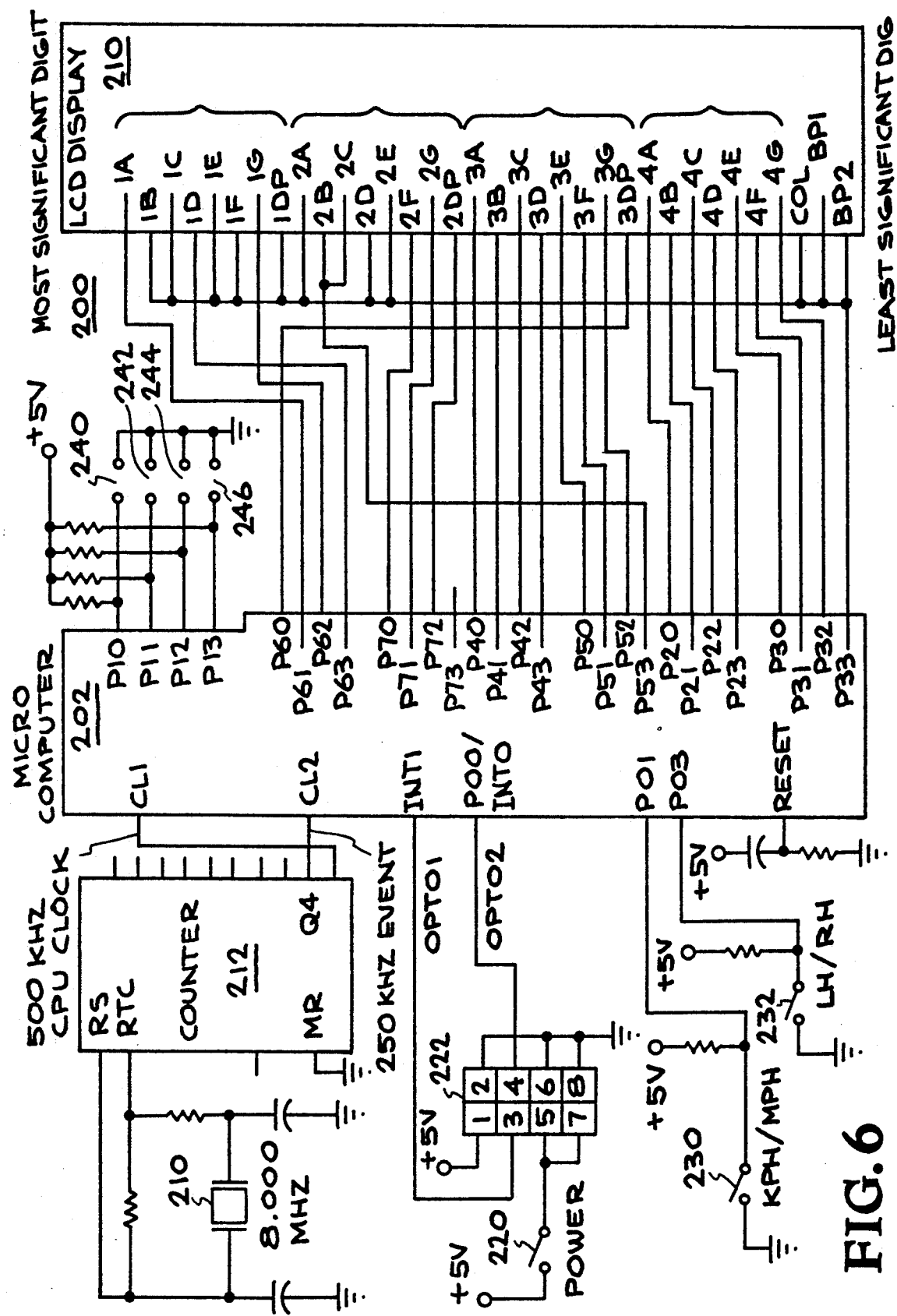
FIG. 6 is a schematic diagram of a processor circuit board for a golf swing-monitoring device, according to the invention.

FIG. 6 shows a schematic diagram of the electronic circuit components on a processor circuit board assembly 200 for a golf swing-monitoring device 10, according to the invention. The assembly 200 include a 4-bit single-chip, low-power-consumption microcomputer 202, commercially provided as the PD7508B by NEC Corporation for portable applications. The microcomputer 202 has a set of 92 instructions available and contains 4096 8-bit words of read-only-memory (ROM) program storage memory and 224 4-bit words of random-access memory (RAM).

A conventional 4-digit, seven-segment liquid crystal display (LCD) device 210 is used to provide a display of 3 numbers in the least significant positions of the display. The most significant position of the display is utilized to provide indicator bars for TEMPO, SPEED, and KPH/MPH, as described in connection with the discussion of the front panel of the golf swing-monitoring device shown in FIGS. 3A and 3B. As indicated in FIG. 6, the microcomputer 202 provides appropriate control signals to the respective sets of input terminals 1A–1G; 2A–2G; 3A–3G; and 4A–4G for the most significant to the least significant digit displays.

A clock generator circuit includes an 8.000 MHz. crystal 210 as a frequency-control element. A multi-stage binary counter 212 provides a 500 kHz CPU clock signal to a clock input terminal of the microcomputer 202. The multi-stage binary counter 212 also provides a 250 kHz event clock signal to the microcomputer 202. The event clock signal has a period of 4 microseconds. Clubhead speed is determined by counting event clock pulses as the clubhead travels the 3 inches between the IR beams. For a clubhead speed of 170. miles per hour, 250 event clock pulses are counted during a 1 millisecond time interval. For a clubhead speed of 17 miles per hour, 2500 event clock pulses are counted during a 10 millisecond time interval. For a clubhead speed of 1.7 miles per hour, 25,000 event clock pulses are counted during a 100 millisecond time interval.

A power switch 220 provides power to terminals 5 and 7 of a connector 222 to connect power to the IR sources, which correspond to the IR sources described in connection with FIGS. 1 and 2, as described herein above. Terminals 3 and 4 of the connector 222 are connected to the IR detectors associated with each of the IR sources. The right-sensor output signal from the right-sensor IR detector connected to terminal 4 is designated as OPT02 and is connected to an interrupt terminal P00/INT0 of the microcomputer 202. Similarly, the left-sensor output signal from the left-sensor IR detector connected to terminal 3 is designated as OPT01 and is connected to an interrupt terminal P00/INT1 of the microcomputer 202. Both terminals P00/INT0 and P01/INT1 are rising-edge activated to externally interrupt the microcomputer 202. Consequently, the output signals from the IR detectors can function as external interrupt signals for the microcomputer 202.

A MPH/KPH switch 230 corresponds to the miles-per-hour (MPH) or kilometers-per-hour (KPH) slide switch 54 described in connection with the front panel 50 of FIGS. 3A and 3B. This switch is closed to provide a low logic signal to an input port pin P01. A LH/RH switch 232 corresponds to right-hand (RH) or left-hand (LH) player slide switch 56 described in connection with the front panel 50 of FIGS. 3A and 3B. This switch is closed to provide a low logic signal to an input port pin P02.

Four switch means, such as jumper terminals or slide switches 240, 242, 244, 246 with their sliders not shown are provided on the processor circuit board assembly 200. When closed, each of these switches provides a zero logic signal to a respective input pin P10, P11, P12, P13 of the microcomputer 202. These compensation switches are contained inside the enclosure for the golf swing-monitoring device 10 and are used to provide compensation to speed values obtained by the microcomputer 202.

Various ones of the switches are tested by the microcomputer to determine their state so that different software routines are selected and different look-up tables used, depending upon the states of the various switches.

Figure 7A:
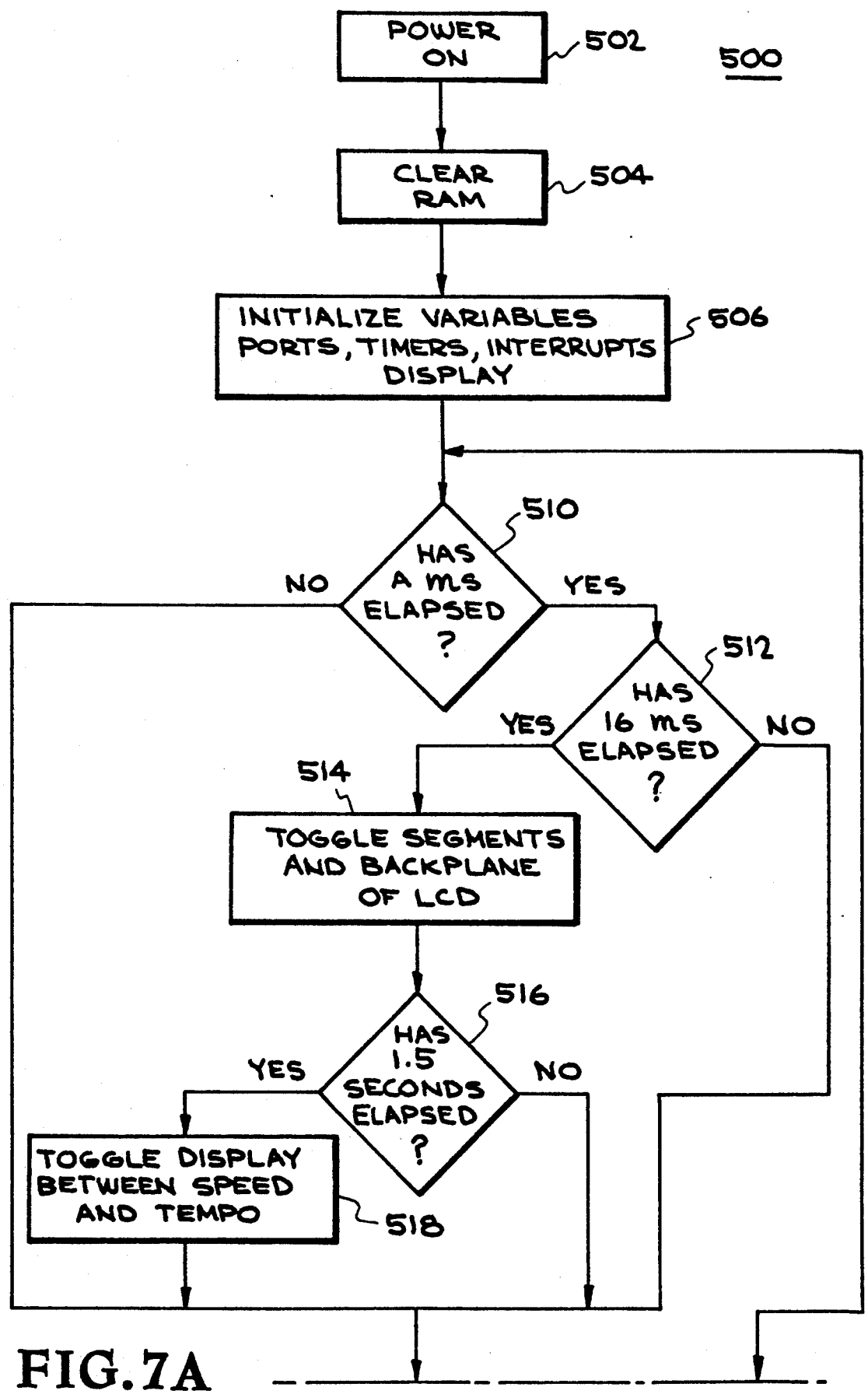
FIGS. 7A and 7B is a flow chart diagram for the main program of the golf swing-monitoring device.
Figure 7B:
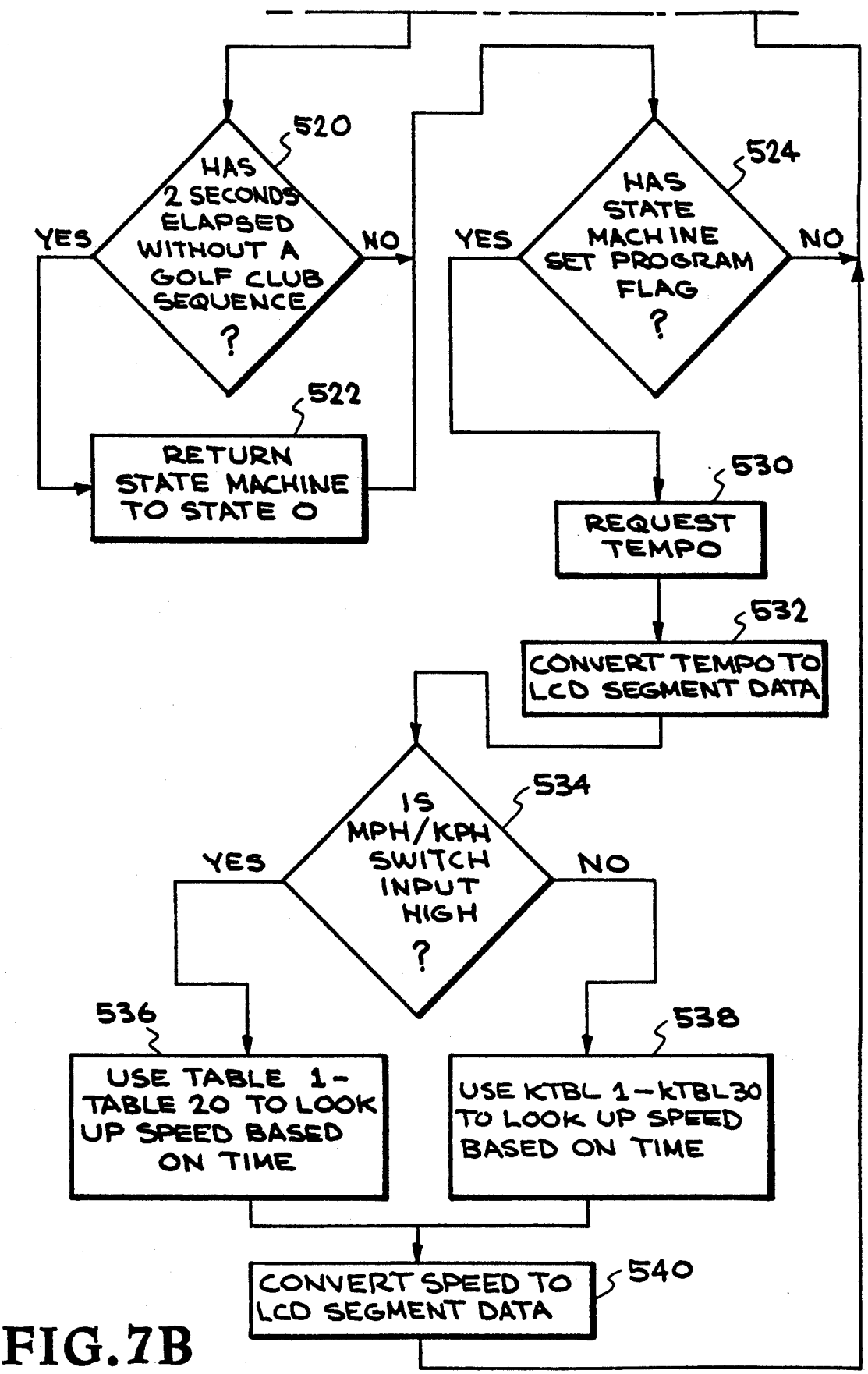

FIGS. 7A and 7B show a flow chart diagram 500 for the main program of the golf swing-monitoring device. This program and other programs are loaded into the ROM program storage memory of the microcomputer 202. The main program operates continuously to alternately display updated values of tempo and speed on the LCD display. The main program is interrupted by external interrupt signals from the IR detectors and from a 1 millisecond timer overflow signal. The external interrupt program computes values of tempo and clubhead speed for display under the control of the main display program.

Step 502 indicates a conventional power-up sequence for the microcomputer. Step 504 clears all of the RAM memory. Step 506 indicates conventional initialization of variables; I/O ports; timers; interrupts; and the display screen.

The main program stored in the ROM provides counting functions which count the 2-microsecond CPU clock pulses to establish periodically occurring control signals for controlling operation of the LCD display. The decision step 510 determines whether a millisecond has elapsed. If a millisecond has elapsed, the program goes to decision block 512 where it is determined if 16 milliseconds has elapsed. If 16 milliseconds has elapsed, the program proceeds to process step 514 where the control signals from the output terminals of the microcomputer 202 for the segments of the 7-segment display and the back plane of the display are toggled, or reversed in voltage polarity to prevent build up of a DC voltage on the LCD device. The toggling occurs at a rate of 16 milliseconds, or approximately 60 times per second. The program then proceeds to decision block 516 where it is determined if 1.5 seconds has elapsed. If 1.5 seconds has elapsed, the process step 518 causes the LCD display screen to alternately toggle every 1.5 seconds between a display of a speed value or a display of a tempo value.

If any of steps 510, 512, or 516 produce negative answers, that is, if the various specified delays have not occurred, the program skips ahead to a decision step 520 where it is determined whether 2 seconds has elapsed without a golf club sequence. If 2 seconds has elapsed without a golf club sequence, step 522 returns the state machine to STATE 0, that is, the idle state. If 2 seconds has not elapsed without a golf club sequence, step 522 proceeds to decision block 524 where it is determined if the state machine has set a PROG flag, which indicates that new values of speed and tempo are available. If the state machine has not set the PROG flag, the program loops back to return to the decision block 510 and begins another sequence of elapsed time measurements.

If the state machine has set the PROG flag, the program proceeds to step 530 in the new value of the tempo value is requested. Step 532 converts the calculated tempo value to appropriate voltage values at the output terminals of the microcomputer for driving the LCD display segments.

A decision step 534 determines whether the MPH/KPH switch is high. If the MPH/KPH switch is high, the program proceeds to the process step 536 where a MPH lookup table is used to look up speed in miles per hour, based on the time elapsed. If the MPH/KPH switch is not high, the program proceeds to the process step 538 where a KPH lookup table is used to look up speed in kilometers per hour, based on the time elapsed. Step 540 converts the speed values to appropriate voltages values at the output terminals of the microcomputer for driving the LCD display segments. After step 540, the program returns back to the decision block 510 to repeat the program sequence.

Figure 8A:
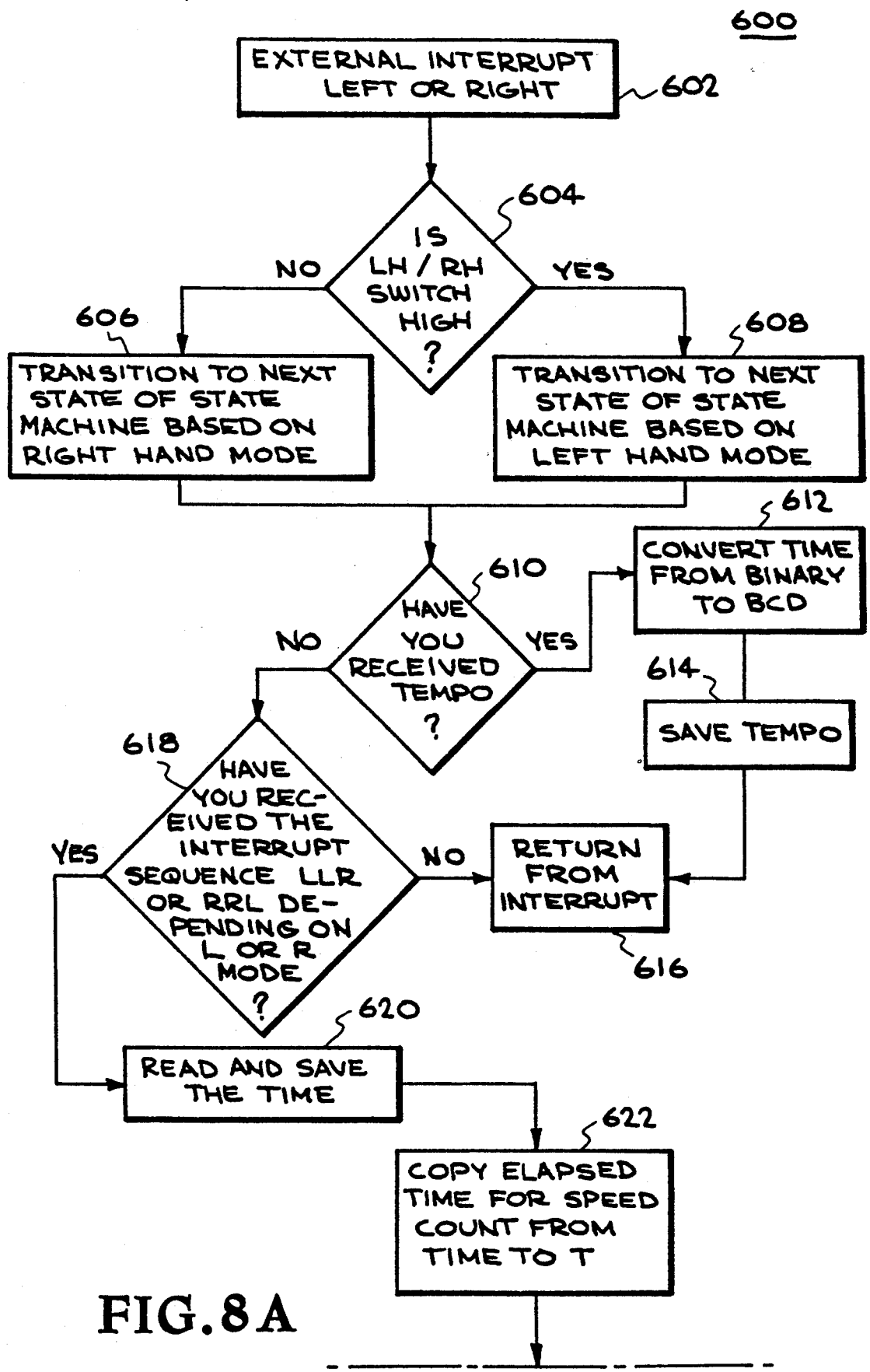
FIGS. 8A and 8B is a flow chart diagram for an external interrupt program for either left or right-handed golfers.
Figure 8B:
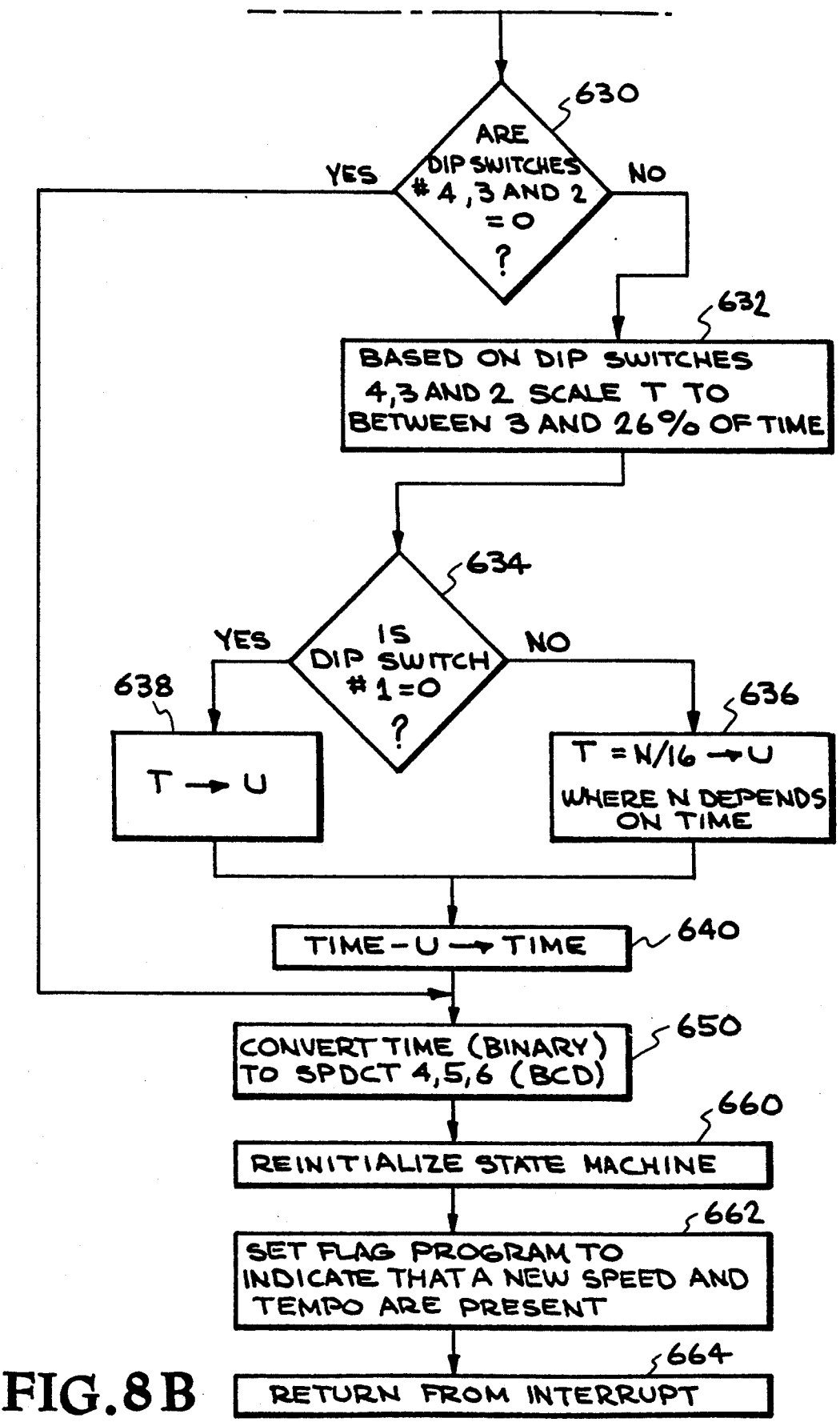

FIGS. 8A and 8B show a flow chart diagram 600 for the external interrupt program for either left or right-handed golfers. External interrupt signals are provided to the microcomputer as INT1 for the left-sensor signal and as INT0 for the right-sensor signal. The interrupt program sets flags for the main program to process, such as toggling the backplane voltages on the LCD display and using a lookup table to provide a compensated speed value. Step 602 is initiated when either a left-sensor signal or a right-sensor signal is received by the microcomputer. For testing the system, pulse generators are used to simulate the OPTO1 and OPTO2 received IR signals. The programs proceeds to step 604 where the LH/RH switch is tested. If the LH/RH switch is low, the program proceeds to the process step 606 where a transition to the next state of the state machine as shown in FIG. 5A is made based on the device being in the right-hand mode of operation. Similarly, if the LH/RH switch is high, the program proceeds to the process step 608 where a transition to the next state of the state machine as shown in FIG. 5B is made based on the device being in the left-hand mode of operation.

The program proceeds to decision step 610 where it is determined if a proper tempo sequence of pulses, as described herein above, has been received. For a left-hand mode, a proper tempo sequence is receipt by the microcomputer of a sequence of two left-sensor signals. For a right-hand mode, a proper tempo sequence is receipt by the microcomputer of a sequence of two right-sensor signals.

If a proper sequence of tempo signals (LL or RR) has been received, step 612 converts the binary value of the time between the sequential right-sensor or left-sensor signals to binary-coded-decimal values. Step 614 saves the binary-coded-decimal values of tempo for display by the system. The next step is to return to the main program from the interrupt, as indicated by the step 616.

A proper sequence of tempo signals for a left-hand mode of operation is LLR. A proper sequence of tempo signals for a right-hand mode of operation is RRL. If a proper sequence of tempo signals has not been received, step 618 determines whether a proper sequence of right-sensor and left-sensor signals has been received as interrupt signals. If a proper right-hand or left-hand sequence is not received, the program returns from the interrupt, as indicated by the step 616.

If a proper right-hand sequence RRL or a proper left-hand sequence LLR is received, the program proceeds to step 620 where the elapsed time between the LR sequence for a proper LLR left-hand-mode sequence is read and stored or the elapsed time between the RL sequence for a proper RRL right-hand-mode sequence is read and stored. The elapsed time is stored as a variable called TIME, where this variable indicates measured clubhead speed. The program proceeds to step 622 where the elapsed time TIME for a speed count measurement is copied into memory as a variable called T.

It was found that the actual value of clubhead speed did not exactly match the measured value of clubhead speed because of software and hardware delays in the system. In order to provide compensation and calibration for individual system, means are provided for increasing the values of measured speed. The switches 242, 244, 246 are set to provide a 3-bit code. This code selects one of eight different predetermined percentages by which to increase the measured clubhead speed. Look-up tables are used to perform the speed-value conversion. A number of look-up tables are used, each of which covers a predetermined range of clubhead-speed values.

A decision step 630 examines the state of the DIP compensation switches 242, 244, 246 on the circuit board. If the switches 242, 244, 246 are not set to 0, the program proceeds to step 632. Step 632 tests the settings of the DIP switches 242, 244, 246 and scales the value of T to various values between 3.2% and 26% of the values of the TIME variable.

example, the code 001 increases the measured speed value by 3.2%. The percentage increases range from 0% to 26% as indicated by the headings for the eight columns in the table. The increased speed values are useful as factory or field adjustments to compensate for mechanical alignment and spacing between the IR beams as well as software and electronic delays.

In each of the eight columns are measured values of the actual speed as measured and displayed by the system. Some of the entries have two measurement values

TABLE 1

| TIME (MSEC.) | SPEED (MPH) | 000/0% | 001/3.2% | 010/6.7% | 011/10% | 100/141% | 101/18% | 110/22% | 111/26% |
|---|---|---|---|---|---|---|---|---|---|
| 70 | 2.44 | 1.5 | 1.8/1.5 | 2.0/1.5 | 2.2/1.5 | 2.4/1.5 | 2.6/1.5 | 2.8/1.5 | 3.0/1.5 |
| 50 | 3.4 | 3.6 | 3.7/3.6 | 3.9/3.6 | 4.0/3.6 | 4.2/3.6 | 4.3/3.6 | 4.5/3.6 | 4.6/3.6 |
| 30 | 5.7 | 5.8 | 6.0/5.8 | 6.2/5.8 | 6.4/5.8 | 6.4/5.8 | 6.7/5.8 | 7.0/5.8 | 7.3/5.8 |
| 20 | 8.5 | 8.6 | 8.9/8.6 | 9.1/8.6 | 9.5/8.6 | 9.8/8.6 | 10.1/8.6 | 10.4/8.6 | 10.9/8.6 |
| 15 | 11.4 | 11.4 | 11.8/11.4 | 12.3/11.4 | 12.5/11.4 | 13/11.4 | 13.5/11.3 | 14/11.4 | 14.3/11.4 |
| 10 | 17 | 16.8 | 17.2/16.8 | 18.2/16.8 | 18.7/16.8 | 19/16.8 | 20/16.8 | 20/16.8 | 21/16.8 |
| 8 | 21 | 21 | 22/22 | 22/22 | 23/22 | 24/22 | 25/22 | 26/22 | 27/22 |
| 6 | 28 | 28 | 29/29 | 30/29 | 31/29 | 32/29 | 34/30 | 35/30 | 36/30 |
| 5 | 34 | 35 | 36/35 | 37/35 | 38/36 | 40/36 | 41/37 | 42/37 | 43/38 |
| 4 | 43 | 43 | 44/43 | 46/44 | 47/45 | 49/46 | 50/46 | 52/47 | 54/47 |
| 3 | 57 | 57 | 58/58 | 60/59 | 63/60 | 65/62 | 67/63 | 69/64 | 71/65 |
| 2.5 | 68 | 68 | 71/70 | 73/72 | 75/73 | 78/75 | 80/77 | 82/78 | 84/80 |
| 2.2 | 77 | 78 | 80/79 | 82/81 | 83/83 | 88/85 | 90/88 | 94/90 | 97/92 |
| 2 | 85 | 84 | 88/87 | 90/89 | 93/91 | 97/95 | 101/97 | 104/101 | 107/104 |
| 1.8 | 95 | 94 | 98/97 | 101/100 | 104/104 | 108/107 | 111/111 | 115/114 | 118/117 |
| 1.6 | 107 | 106 | 110/110 | 113/113 | 116/116 | 122/122 | 127/127 | 131/131 | 135/135 |
| 1.5 | 114 | 113 | 116/116 | 121/121 | 126/126 | 131/131 | 134/134 | 140/140 | 144/144 |
| 1.4 | 122 | 121 | 126/126 | 131/130 | 134/134 | 140/140 | 145/145 | 150/150 | 154/154 |
| 1.3 | 131 | 131 | 135/135 | 140/140 | 145/145 | 150/150 | 156/156 | 161/161 | 168/168 |
| 1.2 | 142 | 142 | 146/147 | 151/151 | 157/156 | 164/164 | 169/169 | 175/175 | 199/199 |
| 1.1 | 155 | 154 | 159/159 | 167/166 | 171/170 | 199/199 | .../199 | .../199 | 199/199 |
| 1.08 | 158 | 157 | 162/161 | 168/168 | 173/173 | .../199 | | | 199/199 |
| 1.06 | 161 | 157 | 162/162 | .../168 | 173/173 | .../199 | | | |
| 1.04 | 164 | 166 | 169/169 | .../199 | 199/199 | | | | |
| 1.02 | 167 | 168 | 173/171 | .../199 | .../199 | | | | |
| 1 | 170 | 171 | .../199 | .../199 | .../199 | | | | |

As mentioned previously, the event clock signal has a period of 4 microseconds and clubhead speed is determined by counting event clock pulses as the clubhead travels the 3 inches between the IR beams. For a clubhead speed of 170 miles per hour, 250 event clock pulses are counted during a 1 millisecond time interval. For a clubhead speed of 17 miles per hour, 2500 event clock pulses are counted during a 10 millisecond time interval. For a clubhead speed of 1.7 miles per hour, 25,000 event clock pulses are counted during a 100 millisecond time interval.

Table 1 illustrates clubhead speed display data taken on the electronic portion of the system as shown in FIG. 6. Input signals OPTO1 and OPTO2 were simulated with a pulse generator. The first column of the table shows various time values in milliseconds corresponding to various tempo speeds. The second column shows calculated speed values in miles per hour corresponding to the time intervals in the first column. The calculated speed values range from 2.44 mph, corresponding to an interval of 70 milliseconds to a value of 170 mph, corresponding to an interval of 1 millisecond.

The eight columns on the right side of the table show clubhead speed values displayed on the LCD display for the various values of time shown in the first column. At the top of each of the eight columns are the binary codes (000-111) set by the slide switches 242-246, which are identified as DIP SWITCHES 4, 3, 2 in the flowchart. A 0 value indicates that the switch is open. Next to each of the binary codes at the top of each of the columns is the value of the percentage increase expected when a particular binary code is used. For separated by a "/" symbol. The first of these numbers is the value of clubhead speed measured and displayed of the LCD display when the switch 240 is open, or at the 0 state. The second of these numbers is the measured and displayed value of clubhead speed obtained when the DIP switch 240 was closed.

The purpose of the switch 240 is to provide gradual increases in compensation, with greater compensation being made at higher speeds. Inspection of the second values in each column shows the gradual increase in compensation as a function of clubhead speed. At the lower speeds, such as at 8.5 miles per hour, the second value in each of the columns is the same as the uncompensated value for a 000 binary code. Note that the first values in each column is higher than the calculated value showing the effect of compensating with the DIP switches 242-246. The second values show that switch 240 provides for gradual increases in compensation so that no compensation is used at the lower clubhead speeds. At the higher clubhead speeds, more compensation is provided. At the highest speeds, such as at 114 mph where the time interval is 1.5 milliseconds, the second value in each column is the same as the first value in each column. In practice, the second gradually compensated values are used. The first set of values are useful in measuring the performance of the system.

The scaling of the variable T referred to in step 632 is accomplished, for example, using look-up tables. The look-up tables are arranged to cover, for example, a number of subranges of speed. The lookup tables convert, or map, the measured time values to a compensated value of T, depending on the value of the DIP switch codes.

In decision step 634 the setting of the DIP switch 240 is tested. If the DIP switch 240 is not set to 0, the program goes to step 636. The variable T is multiplied by N/16 to provide a compensation variable U. U is a scaled version of T. N is an integer, 0 to 16, and N depends on the value of TIME. N is a larger number for low speeds and a smaller number for higher speeds. T and U are inversely proportional to the clubhead speed, so that small values of T or U represent large values of clubhead speed.

If the DIP switch 1 has a value of 0, step 638 shows that the variable T is not scaled as a function of N.

In step 640, the value of U is subtracted from the elapsed TIME variable to provide an adjusted, compensated value of TIME. The program then proceeds to step 650 where the binary values of TIME are converted to binary coded decimal values of a variable SPDCT, which are stored and used by the microcomputer to display current values of clubhead speed.

If the switches 242, 244, 246 are set to 0, the compensation steps 630–640 are skipped and the program proceeds directly to step 650 from step 630.

Step 660 reinitializes the state machines represented by FIGS. 5A and 5B. Step 562 set the flag PROG to indicate that new values of speed and tempo are available to be displayed by the microcomputer.

Step 664 returns the process from the external interrupt program to the main program.

FIG. 9 shows a flow chart diagram 670 for a timer interrupt routine which operates continuously to measure time interval values and flags required by the programs of the microcomputer. Step 672 generates an interrupt based on periodic one millisecond overflow signals from the timer. In step 674 the values of the variables VCOUNT (256 milliseconds), HCOUNT (16 milliseconds), and TCOUNT (1 milliseconds) are incremented. Step 676 returns the microcomputer from the timer-overflow interrupt program to the main or external interrupt programs.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular us contemplated. It is intended that the scope of the invention be defined by the Claims appended hereto and their equivalents.

I claim:

1. A golf swing-monitoring system for measuring clubhead speed, comprising:
   a first IR transmitter which transmits a first infrared (IR) beam along a predetermined line toward a tee area;
   a first IR sensor for receiving the first IR beam which is reflected from a reflection means mounted to the golf club, said first IR sensor providing a first-sensor output signal indicative of the passage of the golf club through the first IR beam;
   a second IR transmitter which transmits a second IR beam along a predetermined line toward the tee area, wherein said second IR beam is substantially parallel to the first IR beam;
   a second IR sensor for receiving a second IR beam which is reflected from the reflection means mounted to the golf club, said second IR sensor providing a second-sensor output signal indicative of the passage of the golf club through the second IR beam;
   means for detecting the presence of a second-sensor output signal followed by a first-sensor output signal;
   means for measuring the difference in time between the second-sensor output signal and the following first-sensor output signal;
   means for converting the difference in time to a clubhead-speed value indicative of the clubhead speed;
   compensation means for adjusting the clubhead-speed value to a predetermined compensated clubhead-speed value; and
   means for displaying the clubhead-speed value.

2. The system of claim 1 wherein the means for converting the difference in time to a clubhead-speed value indicative of the clubhead speed includes a look-up table.

3. The system of claim 2 wherein the means for converting the difference in time to a clubhead-speed value indicative of the clubhead speed includes a plurality of look-up tables, each of said look-up tables covering a predetermined range of clubhead-speed values.

4. The system of claim 1 wherein the compensation means for adjusting the clubhead-speed value to a predetermined compensated clubhead-speed value includes selection means for selecting one of a plurality of predetermined percentages by which to increase the clubhead-speed value indicative of the clubhead speed.

5. The system of claim 4 wherein the compensation means for adjusting the clubhead-speed value to a predetermined compensated clubhead-speed value includes means for selecting predetermined percentages which vary as a function of clubhead speed.

6. The system of claim 5 wherein the visual display means includes a liquid crystal display (LCD) screen.

7. The system of claim 6 wherein the reflection means mounted to the golf club, includes a cylindrical sleeve, which encircles the hosel at the distal end of a shaft of the golf club and which has an external reflective surface for reflecting the first and the second IR beams to the respective first and second IR sensors.

8. The system of claim 1 wherein the means for measuring the difference in time between the second-sensor output signal and the following first-sensor output signal includes means for counting a number of clock output pulses to measure the time interval between the second-sensor output signal and the following first-sensor output signal.

9. The system of claim 1 wherein the means for detecting the presence of a second-sensor output signal followed by a first-sensor output signal, the means for measuring the difference in time between the second-sensor output signal and the following first-sensor output signal, the means for converting the difference in time to a clubhead-speed value indicative of the clubhead speed, and the compensation means for adjusting the clubhead-speed value to a predetermined compensated clubhead-speed value include a microcomputer which receives the first-sensor output signal and the second-sensor output signal as interrupt signals.

10. The system of claim 1 wherein the means for displaying the clubhead-speed value includes selective means for displaying the clubhead-speed value in either miles-per-hour or kilometers-per-hour units.

11. A golf swing-monitoring system for swing tempo, comprising:
- an IR transmitter which transmits an infrared (IR) beam along a predetermined line toward a tee area;
- an IR sensor for receiving the IR beam which is reflected from a reflection means mounted to the golf club, said IR sensor providing a sensor output signal indicative of the passage of the golf club through the IR beam;
- means for measuring the difference in time between two consecutive sensor output signals;
- means for converting the difference in time between the two consecutive sensor output signals to a tempo value indicative of the tempo of a golf swing;
- visual display means for displaying the swing tempo value.

12. The system of claim 11 wherein the visual display means includes a liquid crystal display (LCD) screen.

13. The system of claim 11 wherein the reflection means mounted to the golf club includes a cylindrical sleeve, which encircles the hosel at the distal end of a shaft of the golf club and which has an external reflective surface for reflecting the IR beams to the IR sensors.

14. The system of claim 11 including a clock pulse source which provides clock output pulses for timing the system and wherein the means for measuring the difference in time between two consecutive sensor output signals includes means for counting a number of clock output pulses to measure the time interval between the two consecutive sensor output signals to providing a tempo value.

15. The system of claim 11 wherein the means for converting the difference in time between the two consecutive sensor output signals to a tempo value indicative of the tempo of a golf swing includes a microcomputer which receives the sensor output signals as interrupt signals.

16. A golf-swing monitoring system for measuring and displaying tempo and clubhead speed parameters for a golfer swinging a golf club having a reflection means mounted thereto through a tee area, comprising:
- a first IR transmitter which transmits a first infrared (IR) beam along a predetermined line toward the tee area;
- a first IR sensor for receiving a first IR beam which in reflected from the reflection means, mounted to the golf club, said first IR sensor providing a first-sensor output signal indicative of the passage of the golf club through the first IR beam;
- a second IR transmitter which transmits a second IR beam along a predetermined line toward the tee area, wherein said second IR beam is substantially parallel to the first IR beam;
- a second IR sensor for receiving a second IR beam which is reflected from the reflection means, mounted to the golf club, said second IR sensor providing a second-sensor output signal indicative of the passage of the golf club through the second IR beam;
- means for detecting the presence of two consecutive second-sensor output signals followed by one first-sensor output signal;
- means for measuring the difference in time between the two consecutive second-sensor output signals;
- means for converting the difference in time between the two consecutive second-sensor output signals to a tempo value indicative of the back swing time, or tempo, of the golf swing;
- means for measuring the difference in time between the second of the two consecutive second-sensor output signals and the following first-sensor output signal;
- means for converting the difference in time between the second of the two consecutive second-sensor output signals and the following first-sensor output signal to a clubhead-speed value indicative of the clubhead speed; and
- visual display means for displaying the tempo value and the clubhead-speed value to the golfer.

17. The system of claim 16 wherein the means for converting the difference in time between the second of the two consecutive second-sensor output signals and the following first-sensor output signal to a clubhead-speed value indicative of the clubhead speed includes a look-up table.

18. The system of claim 16 wherein the means for converting the difference in time between the second of the two consecutive second-sensor output signals and the following first-sensor output signal to a clubhead-speed value indicative of the clubhead speed includes a plurality of look-up tables, each of said look-up tables covering a predetermined range of clubhead-speed values.

19. The system of claim 16 wherein the means for converting the difference in time between the second of the two consecutive second-sensor output signals and the following first-sensor output signal to a clubhead-speed value indicative of the clubhead speed includes means for increasing each value of the clubhead speed by a predetermined percentage.

20. The system of claim 19 wherein the means for increasing each value of the clubhead speed by a predetermined percentage includes switch means for selecting one of a plurality of predetermined percentages.

21. The system of claim 19 wherein the means for increasing each value of the clubhead speed by a predetermined percentage includes switch means for selecting predetermined percentages which vary as a function of the difference in time between the second of the two consecutive second-sensor output signals and the following first-sensor output signal.

22. The system of claim 16 wherein the visual display means for displaying the tempo value and the clubhead-speed value to the golfer includes a liquid crystal display (LCD) screen.

23. The system of claim 22 wherein the visual display means for displaying the tempo value and the clubhead-speed value to the golfer includes means for periodically reversing the polarity of digit display signals and a back plane for the liquid crystal display (LCD) screen.

24. The system of claim 16 wherein the reflection means mounted to the golf club, for reflecting IR energy includes a cylindrical sleeve, which encircles the hosel at the distal end of a shaft of the golf club and which has an external reflective surface for reflecting the first and the second IR beams to the respective first and second IR sensors.

25. The system of claim 16 including a clock pulse source which provides clock output pulses for timing the system and wherein the means for measuring the difference in time between two consecutive second-sensor output signals includes first means for counting a number of clock output pulses to measure the time interval between the two consecutive second-sensor output signals, providing a tempo value.

26. The system of claim 16 wherein the means for measuring the difference in time between the second of the two consecutive second-sensor output signals and the following first-sensor output signal includes means for counting a number of clock output pulses to measure the time interval between the second of the two consecutive second-sensor output signals and the following first-sensor output signal, providing a clubhead-speed value.

27. The system of claim 26 wherein the means for converting to a tempo value and the means for converting to a clubhead-speed value include a microprocessor which converts the clubhead-speed values using lookup tables.

28. The system of claim 16 wherein the means for converting the difference in time between the second of the two consecutive second-sensor output signals and the following first-sensor output signal to a clubhead-speed value indicative of the clubhead speed includes selective means for providing clubhead speed in either miles per hour or kilometers per hour.

29. A method for measuring and displaying golf clubhead speed, comprising the steps of:
transmitting from a first IR transmitter a first infrared (IR) beam along a predetermined line toward a tee area;
receiving with a first IR sensor the first IR beam which is reflected from a reflection means mounted to the golf club;
providing from the first IR sensor a first-sensor output signal indicative of the passage of the golf club through the first IR beam;
transmitting from a second IR transmitter a second IR beam along a predetermined line toward the tee area, wherein said second IR beam is substantially parallel to the first IR beam;
receiving with a second IR sensor a second IR beam which is reflected from the reflection means mounted to the golf club;
providing from the second IR sensor a second-sensor output signal indicative of the passage of the golf club through the second IR beam;
detecting the presence of a second-sensor output signal followed by a first-sensor output signal;
measuring the difference in time between the second-sensor output signal and the following first-sensor output signal;
converting the difference in time to a clubhead-speed value indicative of the clubhead speed;
adjusting the clubhead-speed value to a predetermined compensated clubhead-speed value; and
displaying the clubhead-speed value.

30. The system of claim 29 wherein the step of adjusting the clubhead-speed value to a predetermined compensated clubhead-speed value includes converting the clubhead-speed values to predetermined compensated clubhead-speed values using a look-up table.

31. The method of claim 30 wherein the step of converting includes using a plurality of look-up tables, each of said look-up tables covering a predetermined range of clubhead-speed values.

32. The method of claim 1 wherein the step of adjusting the clubhead-speed value to a predetermined compensated clubhead-speed value includes selecting one of a plurality of predetermined percentages by which to increase the clubhead-speed value indicative of the clubhead speed.

33. The method of claim 32 wherein the step of adjusting the clubhead-speed value to a predetermined compensated clubhead-speed value includes selecting predetermined percentages which vary as a function of clubhead speed.

34. The method of claim 29 wherein the step of displaying clubhead speed includes displaying clubhead speed on a liquid crystal display (LCD) screen.

35. The method of claim 29 including the step of reflecting the first and the second IR beams from a cylindrical sleeve, which encircles the hosel at the distal end of a shaft of the golf club and which has an external reflective surface for reflecting the first and the second IR beams to the respective first and second IR sensors.

36. The method of claim 29 wherein the step of measuring the difference in time between the second-sensor output signal and the following first-sensor output signal includes counting a number of clock output pulses to measure the time interval between the second-sensor output signal and the following first-sensor output signal.

37. The method of claim 29 wherein the steps of detecting the presence of a second-sensor output signal followed by a first-sensor output signal, measuring the difference in time between the second-sensor output signal and the following first-sensor output signal, converting the difference in time to a clubhead-speed value indicative of the clubhead speed, and adjusting the clubhead-speed value to a predetermined compensated clubhead-speed value include performing these steps with a microcomputer which receives the first-sensor output signal and the second-sensor output signal as interrupt signals.

38. The method of claim 29 wherein the step of displaying the clubhead-speed value includes selectively displaying the clubhead-speed value in either miles-per-hour or kilometers-per-hour units.

39. A method for measuring and displaying golf swing tempo, comprising the steps of:
transmitting from an IR transmitter a first infrared (IR) beam along a predetermined line toward a tee area;
receiving with an IR sensor the IR beam which is reflected from a reflection means mounted to the golf club;
providing from said IR sensor a sensor output signal indicative of the passage of the golf club through the IR beam;
measuring the difference in time between two consecutive sensor output signals;
converting the difference in time between the two consecutive sensor output signals to a tempo value indicative of the tempo of a golf swing;
displaying the swing tempo value.

40. The method of claim 39 including displaying the swing tempo value on a liquid crystal display (LCD) screen.

41. The method of claim 39 including the step of reflecting the IR beam from a cylindrical sleeve, which encircles the hosel at the distal end of a shaft of the golf club and which has an external reflective surface for reflecting the IR beams to the IR sensors.

42. The method of claim 39 including measuring the difference in time between two consecutive sensor output signals by counting a number of clock output pulses from a clock pulse source to measure the time interval between the two consecutive sensor output signals to provide a tempo value.

43. The method of claim 39 wherein the step of converting the difference in time between the two consecutive sensor output signals to a tempo value indicative of the tempo of a golf swing includes performing these steps with a microcomputer which receives the sensor output signals as interrupt signals.

44. A method for measuring and displaying tempo and clubhead speed parameters for a golfer swinging a golf club having a reflection means mounted thereto through a tee area, comprising:
- transmitting from a first IR transmitter a first infrared (IR) beam along a predetermined line toward the tee area;
- receiving with a first IR sensor a first IR beam which is reflected from the reflector mounted to the golf club;
- providing from the first IR sensor a first-sensor output signal indicative of the passage of the golf club through the first IR beam;
- transmitting from a second IR transmitter a second IR beam along a predetermined line toward the tee area, wherein said second IR beam is substantially parallel to the first IR beam;
- receiving with a second IR sensor a second IR beam which is reflected from the reflection means mounted to the golf club;
- providing from said second IR sensor a second-sensor output signal indicative of the passage of the golf club through the second IR beam;
- detecting the presence of two consecutive second-sensor output signals followed by one first-sensor output signal;
- measuring the difference in time between the two consecutive second-sensor output signals;
- converting the difference in time between the two consecutive second-sensor output signals to a tempo value indicative of the back swing time, or tempo, of the golf swing;
- measuring the difference in time between the second of the two consecutive second-sensor output signals and the following first-sensor output signal;
- converting the difference in time between the second of the two consecutive second-sensor output signals and the following first-sensor output signal to a clubhead-speed value indicative of the clubhead speed; and
- displaying the tempo value and the clubhead-speed value to the golfer.

45. The method of claim 44 wherein the step of converting the difference in time between the second of the two consecutive second-sensor output signals and the following first-sensor output signal to a clubhead-speed value indicative of the clubhead speed includes using a look-up table.

46. The method of claim 44 wherein the step of converting the difference in time between the second of the two consecutive second-sensor output signals and the following first-sensor output signal to a clubhead-speed value indicative of the clubhead speed includes using a plurality of look-up tables, each of said look-up tables covering a predetermined range of clubhead-speed values.

47. The method of claim 44 wherein the step of converting the difference in time between the second of the two consecutive second-sensor output signals and the following first-sensor output signal to a clubhead-speed value indicative of the clubhead speed includes modifying each value of the clubhead speed by a predetermined percentage.

48. The method of claim 47 wherein the step of modifying each value of the clubhead speed by a predetermined percentage includes selecting one of a plurality of predetermined percentages which vary as a function of clubhead speed.

49. The method of claim 47 wherein the step of increasing each value of the clubhead speed by a predetermined percentage includes selecting predetermined percentages which vary as a function of the difference in time between the second of the two consecutive second-sensor output signals and the following first-sensor output signal.

50. The method of claim 44 wherein the step of displaying the tempo value and the clubhead-speed value to the golfer includes alternately displaying these values on a liquid crystal display (LCD) screen.

51. The method of claim 44 wherein the step of reflecting the first and the second IR beams includes reflecting IR from a cylindrical sleeve, which encircles the hosel at the distal end of a shaft of the golf club and which has an external reflective surface for reflecting the first and the second IR beams to the respective first and second IR sensors.

52. The method of claim 44 including the step of timing the system with clock output pulses from a clock pulse source and measuring the difference in time between two consecutive second-sensor output signals by counting a number of clock output pulses to measure the time interval between the two consecutive second-sensor output signals to provide a tempo value.

53. The method of claim 52 wherein the step of measuring the difference in time between the second of the two consecutive second-sensor output signals and the following first-sensor output signal includes counting a number of clock output pulses to measure the time interval between the second of the two consecutive second-sensor output signals and the following first-sensor output signal, providing a clubhead-speed value.

54. The method of claim 44 wherein the steps of converting to a tempo value and for converting to a clubhead-speed value include using a microprocessor to converts the clubhead-speed values using lookup tables.

55. The method of claim 44 wherein the step of converting the difference in time between the second of the two consecutive second-sensor output signals and the following first-sensor output signal to a clubhead-speed value indicative of the clubhead speed includes displaying clubhead speed in either miles per hour or kilometers per hour.

* * * * *